US009846732B2

(12) United States Patent
Farver et al.

(10) Patent No.: US 9,846,732 B2
(45) Date of Patent: Dec. 19, 2017

(54) COMMUNICATING WITH DATA STORAGE SYSTEMS

(75) Inventors: Jennifer M. Farver, Cambridge, MA (US); Ben Thomas, Bedford, MA (US); Joyce L. Vigneau, Stoneham, MA (US); David Fournier, Hoboken, NJ (US); Ben Fisher, Baldwin, NY (US); Gary Fernandez, Concord, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 12/705,129

(22) Filed: Feb. 12, 2010

(65) Prior Publication Data

US 2010/0217783 A1   Aug. 26, 2010

Related U.S. Application Data

(60) Provisional application No. 61/152,640, filed on Feb. 13, 2009.

(51) Int. Cl.
*G06F 17/30* (2006.01)
*H04L 29/08* (2006.01)

(52) U.S. Cl.
CPC ........ *G06F 17/30572* (2013.01); *H04L 67/36* (2013.01)

(58) Field of Classification Search
CPC ......... G06F 17/30289; G06F 17/30294; G06F 17/30607; G06F 17/30575;

(Continued)

(56) References Cited

U.S. PATENT DOCUMENTS 4,901,221 A   2/1990  Kodosky et al.
4,914,568 A   4/1990  Kodosky et al.
(Continued)

FOREIGN PATENT DOCUMENTS

CN   1961313     5/2007
CN   101000621   7/2007
(Continued)

OTHER PUBLICATIONS

Danikauskas, Tomas, et al., "Graphical User Interface Development on the Basis of Data Flows Specification." Computer and Information Sciences—ISCIS 2005 Lecture Notes in Computer Science, Jan. 1, 2005, pp. 904-914.

(Continued)

*Primary Examiner* — Evan Aspinwall
(74) *Attorney, Agent, or Firm* — Occhiuti & Rohlicek LLP

(57) ABSTRACT

In some aspects, a method includes connecting over a network to a data storage system, the data storage system storing data objects. A dataflow graph that includes nodes representing data processing components connected by links that represent flows of data access an interface of the data storage system. The interface provides functions for accessing the data objects. At least one of the data processing components performs operations on a received input flow of data that enable the functions provided by the interface to modify one or more stored data objects, and performs operations in response to functions provided by the interface to generate an output flow of data.

59 Claims, 7 Drawing Sheets

(58) Field of Classification Search
CPC ......... G06F 17/30292; G06F 17/30386; G06F 17/3056; G06F 17/30312; G06F 17/24; G06F 17/3089; G06F 17/30572; G06F 8/34; G06F 11/3632; G06F 11/3664; G06F 3/0481; G06F 3/04817; G06F 9/4436; G06F 9/5038; G06F 9/54; G06F 3/048; G06F 3/04842; G06F 17/227; G06F 17/30126; G06F 17/30235; G06F 17/30991; G06F 17/30994; G06F 17/30418; H04L 67/2852; H04L 67/36; G01R 31/31912; Y10S 15/967; Y10S 715/97
USPC ......... 707/802, 803, 804, 805, 812, E17.005
See application file for complete search history.

(56) References Cited

U.S. PATENT DOCUMENTS

| | | | |
|---|---|---|---|
| 5,291,587 | A | 3/1994 | Kodosky et al. |
| 5,301,336 | A | 4/1994 | Kodosky et al. |
| 5,438,659 | A | 8/1995 | Notess et al. |
| 5,481,741 | A | 1/1996 | McKaskle et al. |
| 5,844,554 | A | 12/1998 | Geller et al. |
| 5,966,072 | A | 10/1999 | Stanfill et al. |
| 6,064,812 | A | 5/2000 | Parthasarathy et al. |
| 6,102,965 | A | 8/2000 | Dye et al. |
| 6,173,438 | B1 | 1/2001 | Kodosky et al. |
| 6,219,628 | B1 | 4/2001 | Kodosky et al. |
| 6,300,948 | B1* | 10/2001 | Geller .................. G06F 8/34 715/744 |
| 6,437,805 | B1 | 8/2002 | Sojoodi et al. |
| 6,694,321 | B1* | 2/2004 | Berno ................ G06F 17/3056 |
| 6,763,515 | B1 | 7/2004 | Vazquez et al. |
| 6,801,229 | B1 | 10/2004 | Tinkler |
| 7,120,876 | B2 | 10/2006 | Washington et al. |
| 7,164,422 | B1* | 1/2007 | Wholey, III .......... G06F 8/34 345/440.1 |
| 7,167,850 | B2 | 1/2007 | Stanfill |
| 7,281,018 | B1 | 10/2007 | Begun |
| 7,353,464 | B1* | 4/2008 | Kundu .............. G06F 17/30392 707/999.01 |
| 7,533,347 | B2 | 5/2009 | Santori et al. |
| 7,624,375 | B2 | 11/2009 | Santori et al. |
| 7,701,869 | B2 | 4/2010 | Hogan |
| 7,756,907 | B2* | 7/2010 | Stolte et al. .................. 707/805 |
| 7,895,586 | B2* | 2/2011 | Ozone ........................... 717/155 |
| 7,937,665 | B1 | 5/2011 | Vazquez et al. |
| 8,146,007 | B2 | 3/2012 | Ramamoorthy et al. |
| 8,156,481 | B1 | 4/2012 | Koh et al. |
| 9,323,824 | B2 | 4/2016 | Vigneau |
| 2001/0020291 | A1 | 9/2001 | Kudukoli et al. |
| 2001/0024211 | A1 | 9/2001 | Kudukoli et al. |
| 2001/0034733 | A1* | 10/2001 | Prompt et al. ............ 707/102 |
| 2001/0047402 | A1 | 11/2001 | Saimi et al. |
| 2002/0170042 | A1 | 11/2002 | Do et al. |
| 2003/0172193 | A1 | 9/2003 | Olsen |
| 2003/0174165 | A1 | 9/2003 | Barney |
| 2003/0195867 | A1 | 10/2003 | Nye |
| 2004/0015783 | A1* | 1/2004 | Lennon et al. ............ 715/523 |
| 2004/0034848 | A1* | 2/2004 | Moore et al. .............. 717/117 |
| 2004/0044912 | A1* | 3/2004 | Connary et al. ............ 713/201 |
| 2004/0093342 | A1 | 5/2004 | Arbo et al. |
| 2004/0181543 | A1* | 9/2004 | Wu et al. .................. 707/102 |
| 2004/0187079 | A1 | 9/2004 | Yamada |
| 2004/0210445 | A1 | 10/2004 | Veronese et al. |
| 2004/0239674 | A1* | 12/2004 | Ewald et al. ............... 345/440 |
| 2005/0060647 | A1* | 3/2005 | Doan et al. ................ 715/514 |
| 2005/0066285 | A1 | 3/2005 | Santori et al. |
| 2005/0114369 | A1 | 5/2005 | Gould et al. |
| 2005/0193097 | A1* | 9/2005 | Guthrie ................ H04L 67/40 709/219 |
| 2005/0246717 | A1 | 11/2005 | Poole et al. |
| 2005/0257195 | A1 | 11/2005 | Morrow et al. |
| 2005/0257198 | A1 | 11/2005 | Stienhans |
| 2005/0283478 | A1* | 12/2005 | Choi .................. H04L 67/02 |
| 2005/0289356 | A1 | 12/2005 | Shoham |
| 2006/0036745 | A1 | 2/2006 | Stienhans |
| 2006/0095466 | A1 | 5/2006 | Stevens et al. |
| 2006/0129690 | A1* | 6/2006 | Hill .................... H04L 67/02 709/230 |
| 2006/0179150 | A1* | 8/2006 | Farley .................. H04L 12/24 709/228 |
| 2007/0011668 | A1* | 1/2007 | Wholey .................. G06F 8/34 717/151 |
| 2007/0073712 | A1* | 3/2007 | Falk et al. .................. 707/10 |
| 2007/0079286 | A1* | 4/2007 | Cook .................... G06F 8/38 717/113 |
| 2007/0150429 | A1 | 6/2007 | Huelsman et al. |
| 2007/0192863 | A1* | 8/2007 | Kapoor et al. .................. 726/23 |
| 2007/0233655 | A1 | 10/2007 | Engels |
| 2007/0239628 | A1 | 10/2007 | Peck et al. |
| 2007/0256053 | A1 | 11/2007 | Torgerson et al. |
| 2007/0271381 | A1 | 11/2007 | Wholey et al. |
| 2007/0276689 | A1 | 11/2007 | Slone |
| 2007/0294213 | A1 | 12/2007 | Hacigumus et al. |
| 2008/0049022 | A1 | 2/2008 | Sherb et al. |
| 2008/0082959 | A1 | 4/2008 | Fowler |
| 2008/0091491 | A1* | 4/2008 | Thorpe et al. .................. 705/7 |
| 2008/0256014 | A1 | 10/2008 | Gould et al. |
| 2008/0263386 | A1* | 10/2008 | Darrington et al. .............. 714/4 |
| 2008/0270920 | A1 | 10/2008 | Hudson |
| 2009/0006454 | A1 | 1/2009 | Zarzar et al. |
| 2009/0083313 | A1 | 3/2009 | Stanfill et al. |
| 2009/0319494 | A1* | 12/2009 | Gooder .......................... 707/4 |
| 2009/0327196 | A1 | 12/2009 | Studer et al. |
| 2010/0217783 | A1 | 8/2010 | Farver et al. |
| 2010/0235495 | A1* | 9/2010 | Petersen et al. ............. 709/224 |
| 2010/0262902 | A1 | 10/2010 | Burns |
| 2011/0145748 | A1 | 6/2011 | Farver et al. |
| 2011/0153667 | A1 | 6/2011 | Parmenter et al. |
| 2014/0229846 | A1 | 8/2014 | Abaya et al. |
| 2015/0301861 | A1 | 10/2015 | Lachiusa et al. |

FOREIGN PATENT DOCUMENTS

| | | |
|---|---|---|
| JP | 2004/516529 | 6/2004 |
| WO | 01/95088 | 12/2001 |
| WO | 2002/11344 | 2/2002 |
| WO | WO 2002/11344 | 2/2002 |
| WO | 2006/091624 | 8/2006 |
| WO | WO 2006/091624 | 8/2006 |
| WO | WO 2007/076509 | 7/2007 |

OTHER PUBLICATIONS

International Search Report & Written Option issued in PCT application PCT/US2010/058875, dated Apr. 13, 2011, 13 pages.
International Search Report & Writing Opinion issued in PCT application No. PCT/US2010/024115, dated Apr. 16, 2010, 14 pages.
U.S. Appl. No. 12/959,985, filed Dec. 3, 2010, Specifying User Interface Elements.
U.S. Appl. No. 13/764,998, filed Feb. 12, 2013, Building Applications for Configuring Processes.
Chinese Office Action, with English Translation, application No. 201080016467.5, dated Sep. 23, 2013, 64 pages.
Transaction History, U.S. Appl. No. 12/959,985.
Transaction History, U.S. Appl. No. 13/764,998.
International Search Report and Written Opinion issued in PCT/US2014/15580, dated Jul. 8, 2014 (9 pages).
Chinese Office Action, English Translation, application No. 201080016467.5, dated Jul. 17, 2014, 37 pages.
Japanese Office Action, with English Translation, application No. 2012-543166, dated Oct. 30 2014, 5 pages.
Supplemental European Search Report, European Application No. 10741811.3, dated Aug. 9, 2016 (4 pages).

* cited by examiner

COMMUNICATING WITH DATA STORAGE SYSTEMS

CROSS-REFERENCE TO RELATED APPLICATIONS

This application claims priority to U.S. application Ser. No. 61/152,640, filed on Feb. 13, 2009, incorporated herein by reference.

BACKGROUND

The following description relates to communicating with data storage systems.

External databases containing data can be accessed and controlled in a number of ways. One exemplary technique for interacting with remote data sources is the use of web services. Web services provide a common protocol that web applications can use to connect to each other over a network (e.g., a local area network, or the Internet). One advantage of web services is that they are based on industry standards. The services can be described in extensible markup language (XML) and are communicated over existing hypertext transfer protocol (HTTP) infrastructure. The combination of XML and HTTP forms, for example, allows for the data transfer protocol: Simple Object Access Protocol (SOAP).

SUMMARY

In one aspect, in general, a method includes connecting over a network to a data storage system, the data storage system storing data objects. A dataflow graph includes nodes representing data processing components connected by links that represent flows of data access an interface of the data storage system. The interface provides functions for accessing the data objects. At least one of the data processing components performs operations on a received input flow of data that enable the functions provided by the interface to modify one or more stored data objects, and performs operations in response to functions provided by the interface to generate an output flow of data.

Aspects can include one or more of the following features. A graphical user interface receives input from a user and provides formatting information to at least one of the data processing components. The formatting information defines a format for data records according to one or more fields associated with the data objects, where data records formatted according to the defined format are compatible with the operations performed by the data processing components. The graphical user interface displays data objects and fields associated with the data objects based on rules associated with an operation selected from a plurality of operations. The rules specify which data objects and fields are applicable to the selected operation. The graphical user interface displays only data objects and fields that satisfy the rules. One or more of the data objects and fields displayed by the graphical user interface are selectable. Data objects and fields that satisfy the rules are automatically displayed as selected. The graphical user interface prevents a user from de-selecting data objects and fields that have been automatically displayed as selected. The data processing components generate a request to be sent to the data storage system. The data processing components transform an input having multiple input data records into a single request message. The data processing components transform a single response message received from the data storage system into a plurality of output data records. The data processing components generate the request message based on input parameters representing flows of data. A user alters the input parameters of the data processing components through a metadata browser. The simple object access protocol response received from the data storage system contains acknowledgments of successful function execution and acknowledgements of failed function execution. The data processing components separate the acknowledgments of successful function execution and the acknowledgements of failed function execution. The data processing components forward data associated with the failed function execution and the successful function execution to different ports of the data processing components. Connecting to the data storage system includes transmitting a login request from the data processing components to the data storage system, logging in to the data storage system to obtain session credentials, storing the session credentials, and encoding the stored session credentials into future login requests. The login request is transmitted to an internal gateway. The stored session credentials are encoded into a plurality of concurrent login requests. Generating the output flow of data includes performing operations on one or more batches of partial results received from the data storage system. The one or more data processing components include at least a first data processing component and a second data processing component. The first data processing component receives one or more batches of partial results from the data storage system and provides at least a some of the partial results to the second data processing component while the first data processing component continues to receive batches of partial results. The second processing component generates the output data flow based at least in part on the received partial results.

In another aspect, in general, a system includes a network interface including circuitry for connecting to a data storage system, the data storage system storing data objects; and a data processing environment including at least one processor configured to access, by a dataflow graph that includes nodes representing data processing components connected by links that represent flows of data, an interface of the data storage system, the interface providing functions for accessing the data objects. At least one of the data processing components performs operations on a received input flow of data that enable the functions provided by the interface to modify one or more stored data objects, and performs operations in response to functions provided by the interface to generate an output flow of data.

In another aspect, in general, a system includes means for connecting over a network to a data storage system, the data storage system storing data objects; and means for accessing, by a dataflow graph that includes nodes representing data processing components connected by links that represent flows of data, an interface of the data storage system, the interface providing functions for accessing the data objects. At least one of the data processing components performs operations on a received input flow of data that enable the functions provided by the interface to modify one or more stored data objects, and performs operations in response to functions provided by the interface to generate an output flow of data.

In another aspect, in general, a computer-readable medium stores a computer program that stores instructions for causing a computer to: connect over a network to a data storage system, the data storage system storing data objects; and access, by a dataflow graph that includes nodes representing data processing components connected by links that represent flows of data, an interface of the data storage system, the interface providing functions for accessing the data objects. At least one of the data processing components performs operations on a received input flow of data that enable the functions provided by the interface to modify one or more stored data objects, and performs operations in response to functions provided by the interface to generate an output flow of data.

Aspects can include one or more of the following advantages. Users with large volumes of data can load to and extract data from a database while adhering to typical enterprise data security standards. Large data loads and extracts can be made efficient and can take advantage of the benefits of parallel, data flow programming. A graphical user interface provides current, accurate information about the many objects and fields available which reduces errors of omission and spelling. An interface automatically handles the low-level requirements for interacting with a database, such as operations that require special handling.

Other features and advantages will become apparent from the following description, and from the claims.

DESCRIPTION

It is important for application development to allow network communication between programs. Many modern applications communicate using Remote Procedure Calls (RPC) between objects like DCOM and CORBA; however, HTTP was not originally designed for this communication. RPC represents a compatibility and security problem. For example, firewalls and proxy servers may block this kind of traffic. Because HTTP is supported by all Internet browsers and servers, it is useful to communicate using this protocol if possible. SOAP is a protocol that was created in part to allow HTTP communication between objects. SOAP provides a way to communicate between applications running on different operating systems, with different technologies and programming languages.

Complex business systems typically process data in multiple stages, with the results produced by one stage being fed into the next stage. The overall flow of information through such systems may be described in terms of a directed data flow graph, with vertices in the graph representing components (either data files or processes), and the links or "edges" in the graph indicating flows of data between components.

Graphs also can be used to invoke computations directly. The "CO>OPERATING SYSTEM®" with Graphical Development Environment (GDE) from Ab Initio Software Corporation, Lexington, Mass. is an example of such a system. Graphs made in accordance with this system provide methods for getting information into and out of individual processes represented by graph components, for moving information between the processes, and for defining a running order for the processes. This system includes algorithms that choose interprocess communication methods and algorithms that schedule process execution, and also provides for monitoring of the execution of the graph.

Figure 1:
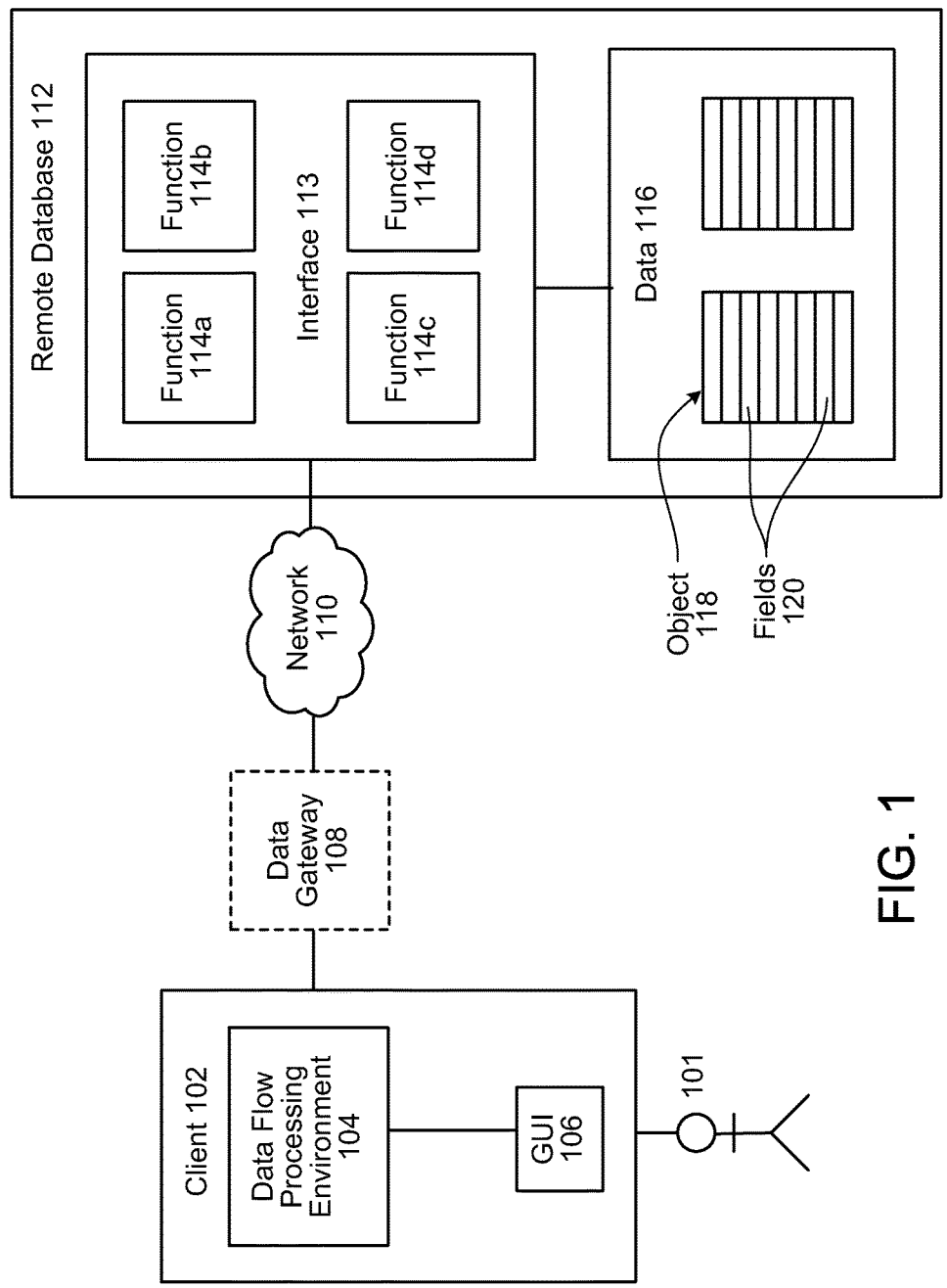
FIG. 1 is an example of a network architecture.

FIG. 1 is an example of network architecture that includes a client 102, a remote database 112, and intervening network entities. In some examples, the remote database 112 hosts data 116 that is accessible to users, subscribers, or customers 101. The data 116 can be composed of objects 118 containing fields 120. In the example of FIG. 1, user 101 is attempting to access data 116 to either access objects 118 stored on remote database 112, or to add new data to the remote database over network 110. In the following description network 110 is often represented as the Internet; however, other networks such as local area networks could be used.

The remote database 112 hosts data for its users, who can read and write data to and from the remote database via the network 110. An example of a remote database 112 that hosts data for its users is the website www.salesforce.com® ("Salesforce"). While a number of examples below may refer to Salesforce implementations, Salesforce is merely an example of a remote data host whose data can be accessed and modified by its users over a network. In some cases, ordinary web services provided by remote databases are inadequate for users with large volumes of data. These high volume users need to read and write data efficiently to the remote database, and typically need to integrate their data with other data systems (such as data files, messaging systems, databases and business reporting tools).

In some examples, the remote database 112 exposes a web service application programming interface 113 (API) in Web Services Description Language (WSDL) which its customers can use to efficiently read and write large data volumes. However, a remote database might fail to provide an implementation of this API. A typical implementation of the API would typically use traditional coding in a language such as Java.

Users (e.g., developers) may find it onerous to implement the standard interface provided by the remote database for several reasons. First, the user may need to ensure that state is maintained between successive web service requests. Second, users may also find it difficult to securely pass requests between their own firewalled environment (e.g., through data gateway 108, which may authorize all communication to and from data sources outside the firewalled environment) and the remote database 112 (which may be a public website). Finally, users may find it difficult to implement the API while minimizing the negative effects of high-latency web services. Furthermore, it would be useful to provide an implementation that takes advantage of a data flow programming environment.

In some examples, there are two ways that graph-based computations interact with distributed services. In some examples, a graph calls a service and relates to the service as if the service were a node in the graph. In other examples, an application relates to a graph such that the graph provides a service. The two cases may be carried out simultaneously. For example, a graph that is providing services to one application may itself call another service to perform part of its computation. The service that one graph calls may be provided by another graph, such that the first graph calls the second rather than containing it as a subgraph, for example.

In some examples, when an operation within the data flow processing environment 104 is executed, it calls a function 114a-d exposed by interface 113 on remote database 112 as a client of the service. For example, a component within data flow processing environment 104 may access a web service using a combination of one or more of SOAP, HTTP, XML, WSDL, and the like to communicate with a web service interface 113 hosted on remote database 112. If successful, components within data flow processing environment 104 may be allowed to access the data 116 stored on the remote database 112.

Figure 2:
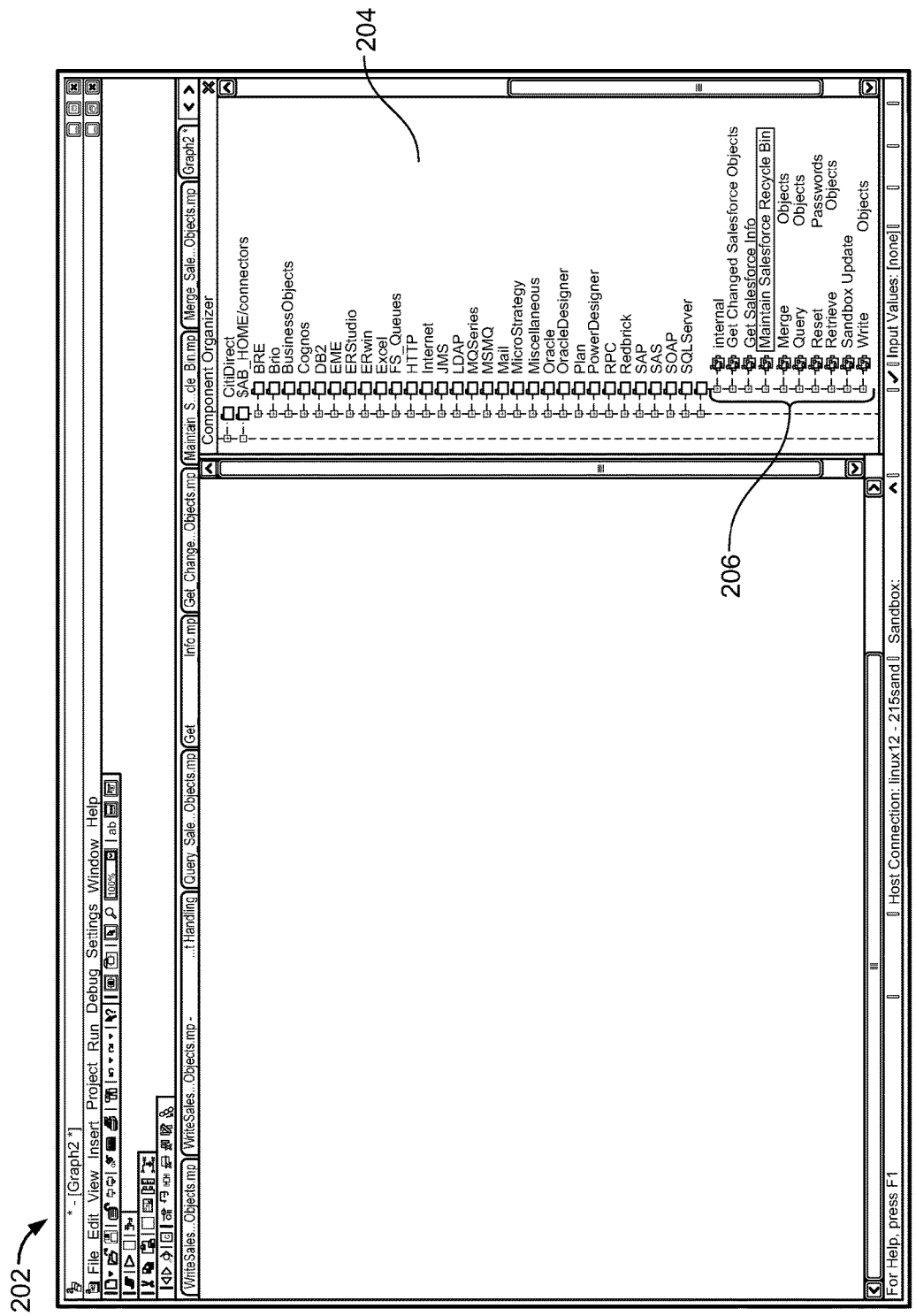
FIG. 2 is an exemplary screenshot of a configurable library.

In some examples, a configurable library may contain components for use in data flow applications ("graphs") such as within data flow processing environment 104. By configuring the components contained within the library, the components can be used to read and write objects within the remote database, and can be used to enable the functions 114a-114d defined in the interface 113 of the remote database 112. FIG. 2 is an example of a browser 202 displaying a library 204 of components 206. Each of the components 206 constitute a reusable piece of programming logic. The components can be used in graphs, and their behavior can be configured by providing a number of parameter values to an instance of the component.

Figure 3:
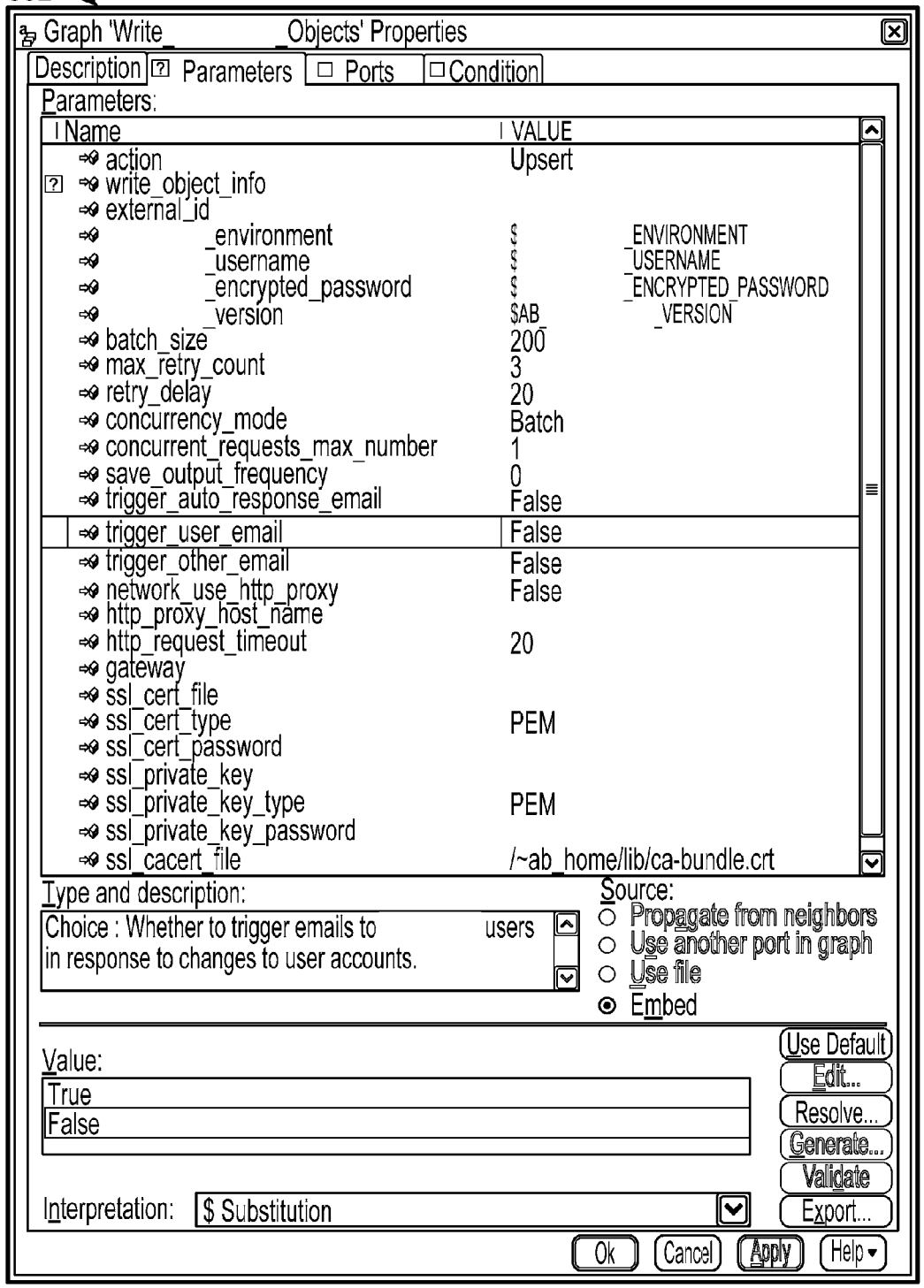
FIG. 3 is an exemplary user interface for configuring parameters.

FIG. 3 is an example of a user interface for configuring the component instance. This includes but is not limited to record format descriptions. In this example, the browser 302 is displaying the "Write_Objects' Properties," and can be used to configure the type of objects read and written by the components 206 (FIG. 2). The browser allows a user to edit both hidden and visible record formats and data transformations used by the components 206. Configuration of these record formats and transformations allow the components to both write and parse requests (e.g., SOAP requests) in order to communicate with the interface of the remote database. For example, the parameters "action" and "trigger*" configure which features to implement in an assembled SOAP request. Some parameters are related to login credentials (username and password), while other parameters govern recoverability (save output frequency), or relate to concurrency, timeout tolerance, and security (e.g., ssl*, and gateway).

Figure 4:
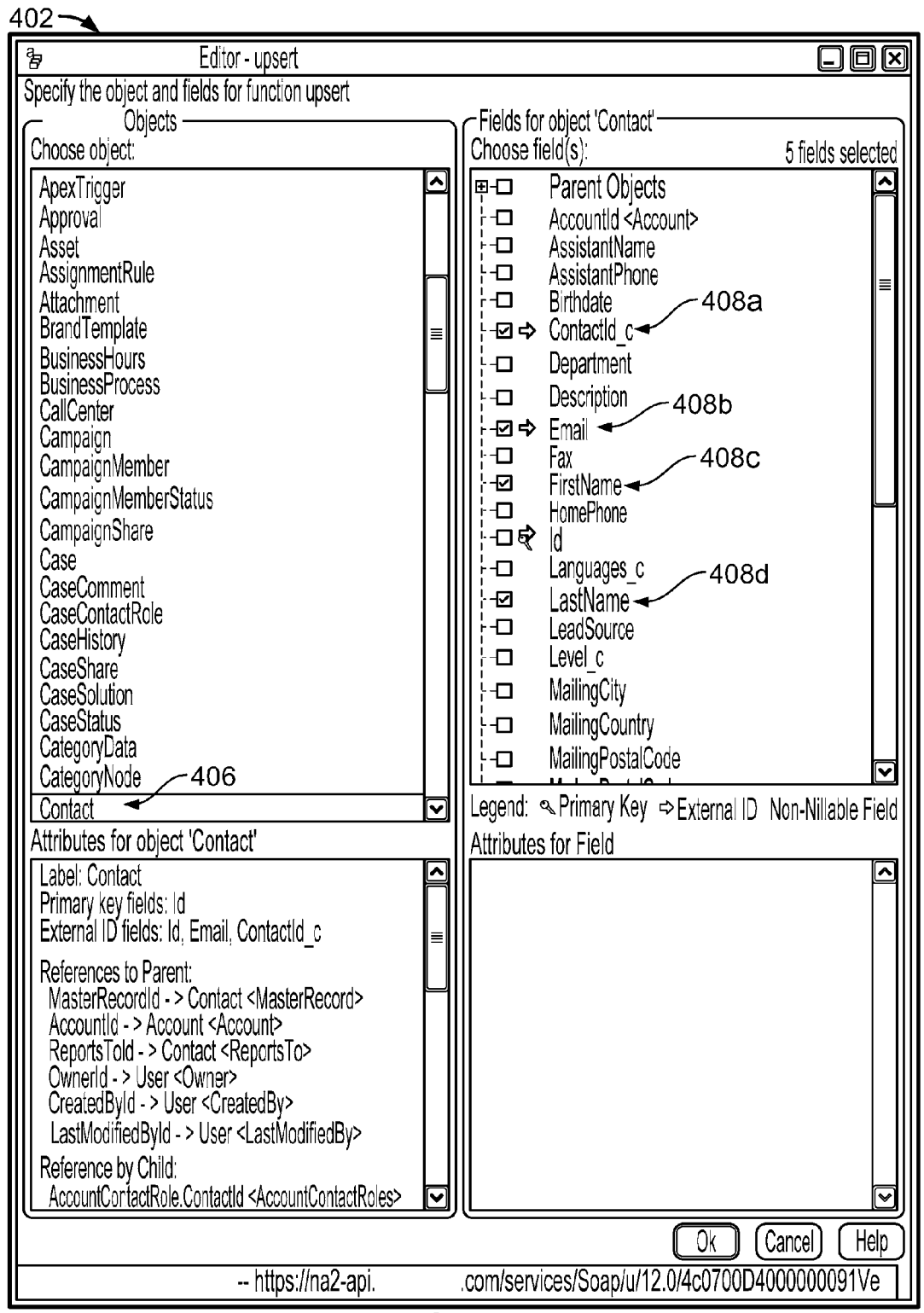
FIG. 4 is an example of browser showing properties of a component.

FIG. 4 is an example of an editor 402 launched from the parameter set (e.g., the parameter set described above in the example of FIG. 3) of the Write Objects component. In some examples, the display of the editor 402 is governed by a SOAP request made to the remote database 112 (FIG. 1). For instance, when a user takes an action to display the editor 402, a SOAP call is made to the remote database 112 to retrieve remotely stored data (e.g., metadata). The SOAP call returns the schema (e.g., the hierarchy of objects, fields, and rules) that govern what is displayed in the browser. In this example, the user has selected the editor for the "Upsert" function on the component's parameter list. In the editor, the user has selected to load data to the "Contact" object 406 and have selected several fields 408a, 408b, 408c, and 408d to write. Based on these selections, the editor constructs a record format consisting of several "types" (e.g., date, date time, integer) according to a data manipulation language (DML) that is used to specify record formats and various functions and expressions used to transform and interact with data records. These types are used to edit hidden and visible parameters of the component. For instance, the value of a component's (e.g., component 104 (FIG. 1)) input record format parameter may be altered by the editor. As a result, to create a SOAP request to send to the remote database 112 (FIG. 1), a user may configure the component and implement compatible data flows into and out of the component. Types created by the user may also be used to edit other component parameters including data transformations.

Furthermore, because the components are configurable, they can be used to read and write any objects in the remote database with no traditional coding required of the user. Using the editor shown in FIG. 3, the user can configure the behavior of the components to meet performance and security requirements Each of the components can enable one or more functions 114a-d (FIG. 1) defined in the interface 113 of the remote database 112. For example, the "Write Objects" component implements the "Create", "Update" and "Upsert" functions of the remote database 112. This allows developers to write data to the remote database using any of the functions provided by the interface 113. Each function has particular behavior that is defined by the remote database 112, and each function can be used to access, manipulate, add, and remove data 116, objects 118, or fields 120.

Being composed of reusable logic, the components can perform data processing upstream and downstream of any HTTP request or HTTP response actions. For example, the data processing performed by the components can include separating response data into success and failure records, transforming many input data records into a single request (e.g., a SOAP request sent to remote database 112), and transforming a single response (e.g., a SOAP response received from remote database 112) into more than one output data record.

As an example, in the "Write Objects" component, a user can use a "Create" function defined by the interface of the remote database which allows users to create new objects in the remote database. If the object already exists (as determined by a key), the Create operation fails. A single SOAP request (or some other type of request) may contain many objects to be created. A non-fault SOAP response will contain information on the outcome of each of these operations.

The "Write Objects" component contains logic to transform N input records into a single SOAP request and to transform a single SOAP response into N output records (where N is a configurable parameter of the component indicating a number of records). By encoding this logic in the component, users can treat data as "flat" records without performing traditional coding to assemble requests and parse responses. The component may also contain logic to separate failed create operations from successful create operations, and can route the data to different ports accordingly. While this function may not be provided by the standard interface of the remote database, the upstream and downstream processing capabilities of the components allow for this added functionality.

Figure 7:
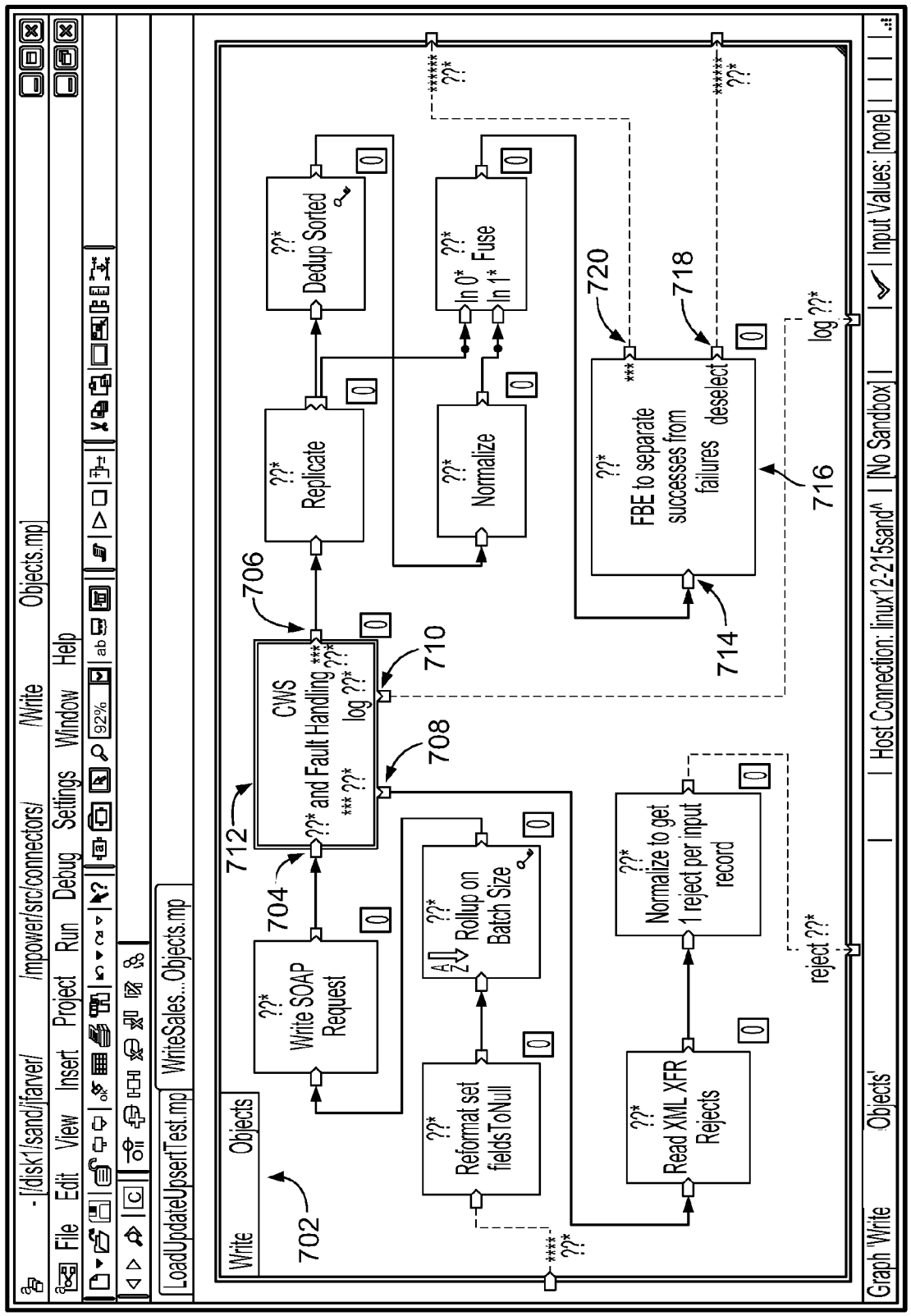
FIG. 7 is an example of data flow design within an exemplary component.

In the example of FIG. 7, the internal data flow of component 702 "Write Objects" is illustrated. Sub-component "CWS and Fault Handling" 712 has ports 704, 706, 708, and 710. Each of the ports may either receive records as input or pass records as output. Port 714 of sub-component "FBE to separate successes from failures" 716 may receive a flow of data at port 714 (e.g., the records containing success or failure indicators as described above). Sub-component 716 contains logic to separate failed operations from successful operations, and can route the data to ports 718 and 720 accordingly.

The arrangement and configuration of the components take advantage of the benefits of data flow programming. For instance, the components enable process, data and (where possible) pipeline parallelism, can run as either batch or continuous processes, and are easy to use with minimal configuration. The components may also include shared log, error and fault handling features.

Some of the components may be restartable. That is, if an application containing one of the restartable components unexpectedly terminates while running, the application can be restarted from the point at which it left off.

Some of the components may contain a "Call Web Service" component. This component allows a user to call a web service using the HTTP 1.1 protocol, wait for a response and, when a response is received, process the response. The configurable behavior of the Call Web Service component is governed by a set of parameters, one of which is a transform. The transform is a set of variables, types, and functions defined in the DML programming language. The instance of the transform relating to the Call Web Service component may contain logic that logs into the remote database and obtains session credentials that can be encoded into subsequent requests. The request is routed to the appropriate URL (which could an internal "data gateway" URL). The transform may also allow concurrent requests to be sent.

The transform constructs the URL to which to send the login request; for example, if the client is operating behind a data gateway 108 (FIG. 1), an internal gateway URL will be used. If the client is not operating behind an internal gateway, the remote database URL will be created, and may additionally contain the WSDL schema code and version number. A login request can then be sent that implements the remote database's interface "login" function. The transform then waits for a response and translates it to obtain the session ID.

For each input record to the component, a URL is constructed to which to send a data request, and the session ID (obtained from an earlier process, described above) is inserted into the request as specified by the WSDL. If the response indicates a timeout, a retry counter is decremented for that particular request. If the request still has retries left, the request is sent again. If the request has no remaining retries left on the counter a failure is logged.

The request is then sent to the remote database, and the transform waits for a response. If the response indicates a success, the transform outputs the successful response to the downstream data flow within data flow processing environment 104 (FIG. 1).

The transform described above may contain a number of additional features. In some examples the transform sends multiple parallel requests, where the depth of parallelism is governed by a parameter of the component. Since each request is sent to a web service (e.g., interface 113 in FIG. 1), this latency will be high. If these requests were not sent in parallel, the elapsed time of the all requests will be approximately equal to the latency of one request multiplied by the total number of requests. By sending requests concurrently, this latency can be reduced by a factor equal to the number of concurrent requests permitted.

Furthermore, the transform may handle HTTP request timeouts by retrying requests up to a configurable number of times. The length of time before declaring a timeout is a configurable parameter of the component, as is the number of times to retry before logging an error. Additionally, in some examples, the transform allows users to send requests to a data gateway, such as data gateway 108 (FIG. 1). This configuration is typical of enterprise computing environments in which high-volume throughput to remote databases is required. Depending on the user's configuration of the component parameters, the request will either be sent to remote database directly, or to a data gateway URL (typically a URL that is internal to a firewalled environment). Finally, the transform may manage session information by obtaining the session ID from the login request, then inserting it into subsequent data requests, which eliminates the need for sessions to be re-authenticated.

An additional transform may be included in the components to facilitate the "Query" function, which allows the querying of objects within the remote database. This transform, among other things, has additional functionality to enable querying of large batches of records. The transform used to enable the Query function sends an initial query request. If the remote database finds a large number of objects in response to this query, it returns some of the objects in its initial response and provides a key which uniquely identifies the query. Subsequent requests to the remote database which use the "QueryMore" function and provide this key will return additional responses to the initial query. The transform supports this operation by introspecting the initial response for the query identifier key and inserting it into subsequent "QueryMore" requests.

In some examples, the components possess the ability to run operations in parallel. For instance, the "Query" operation may return a substantial amount of data. So much, in fact, that the remote database sends it back in small batches and the component must keep asking for 'the next query results'. This leads to a loop starting with Query, looping on QueryMore, and finally finishing. This operation is not only supported, but supported in parallel; that is multiple collections of partial responses can be returned, aggregated and given (eventually) to the rest of the graph. Additionally, to enhance overall performance and throughput, the component may provide partial results to the rest of the graph.

In many cases (such as those described above) the graphs are the driving element of the operations performed by both the client and remote database. In this "mode," the graphs start the connection to the remote database, perform operations, generate results and conclude operation. In this way, the graph is the "driving element." On the other hand, there is another mode of operation in which the graph is driven. The remote database may support a mode in which the remote database initiates contact to a graph that is "listening" for outbound messages from the remote database. This often occurs when a user is using the interface of the remote database (e.g., updating an address on a web page of the remote database). This can be configured to generate a request to a web server and expect a response. This web server may provide web services, and can drive a graph that can generate the response to the remote database request. This graph and response may in turn ask the remote database for information via the interface. In this mode, the graph is "driven"; that is, it provides a service to the remote database.

Referring back to FIG. 1, the functionality of GUI 106 will now be described. In order for users 101 to interact with remote database 112, users create record formats which include all and only the elements that are appropriate for a particular data manipulation operation, and that also accurately reflect the data hierarchy embodied in the structure of the data storage. This can be an onerous, manual task for users both because there are many objects and many fields per object, and because the remote database may have rules concerning the validity and relationships of fields which may not be obvious. Furthermore, the validity of the fields may be different for each operation In addition, in order to implement the programmatic interaction with the remote database, the record format created must be correctly represented in the DML format, which requires specialized knowledge. All of these details can lead to user error.

In order to minimize or prevent user error, a graphical user interface is provided that simplifies the process of selecting the proper objects and fields for a record format. By enforcing rules and conventions associated with the record format and the operations to be performed by the components, GUI 106 can facilitate the generation of correct DML for a substantial set of the operations performed by the components within the data flow processing environment. The GUI 106 may facilitate the proper selection of objects and fields using a common tree control, driven by the context of the specific operation to be performed by a particular component. Furthermore, the GUI can help a user to formulate syntactically correct SOAP requests.

In some examples, the GUI 106 displays only the type of objects and the fields applicable to the operation to be performed by the component, by combining display of completely different hierarchies within the same tree control. For some operations, only the fields of the base object (the main object the operation is to act on) are appropriate to view. For some operations, both the fields of the base object and the fields of any parent object of the base object are appropriate to view. For some operations, the fields of the base object, the fields of any parent object of the base object, and the fields of any child object are appropriate to view The GUI 106 might also only display those fields of a particular object that are applicable to the operation to be performed by the component by evaluating each field individually relative to the context of the operation and the rules regarding valid input for the operation. The GUI 106 may simply not display unnecessary fields; that is, fields not necessary to the operation to be performed may be "suppressed." As an example, if a component is attempting to perform a create operation, and a field is not creatable, the field should not be shown by GUI 106. Because it would never be correct for a user to select this field for this particular operation, user error can be avoided by hiding or suppressing this field.

Figure 5:
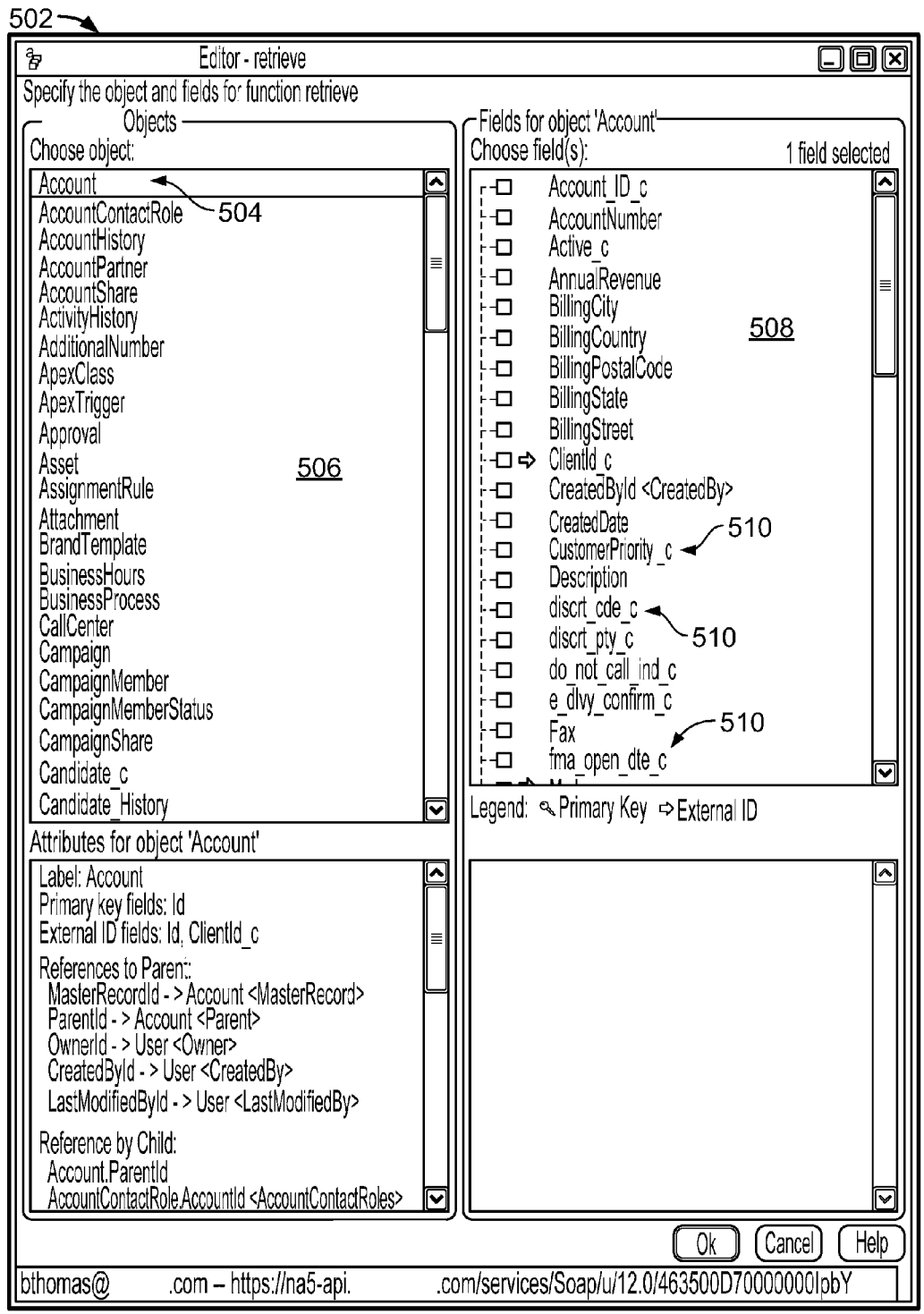
FIGS. 5 and 6 are exemplary screenshots of a GUI.

FIG. 5 is a screenshot taken from GUI 106. In this example, an object 504 ("Account") is selected in the left pane 506 of the editor 502, and its fields 510 are displayed in the right pane 508. All of the fields 510 in the right pane 508 are selectable by a user; that is, all of the fields 510 are valid and can be selected by a user to be included in the DML for the operation being performed.

Figure 6:
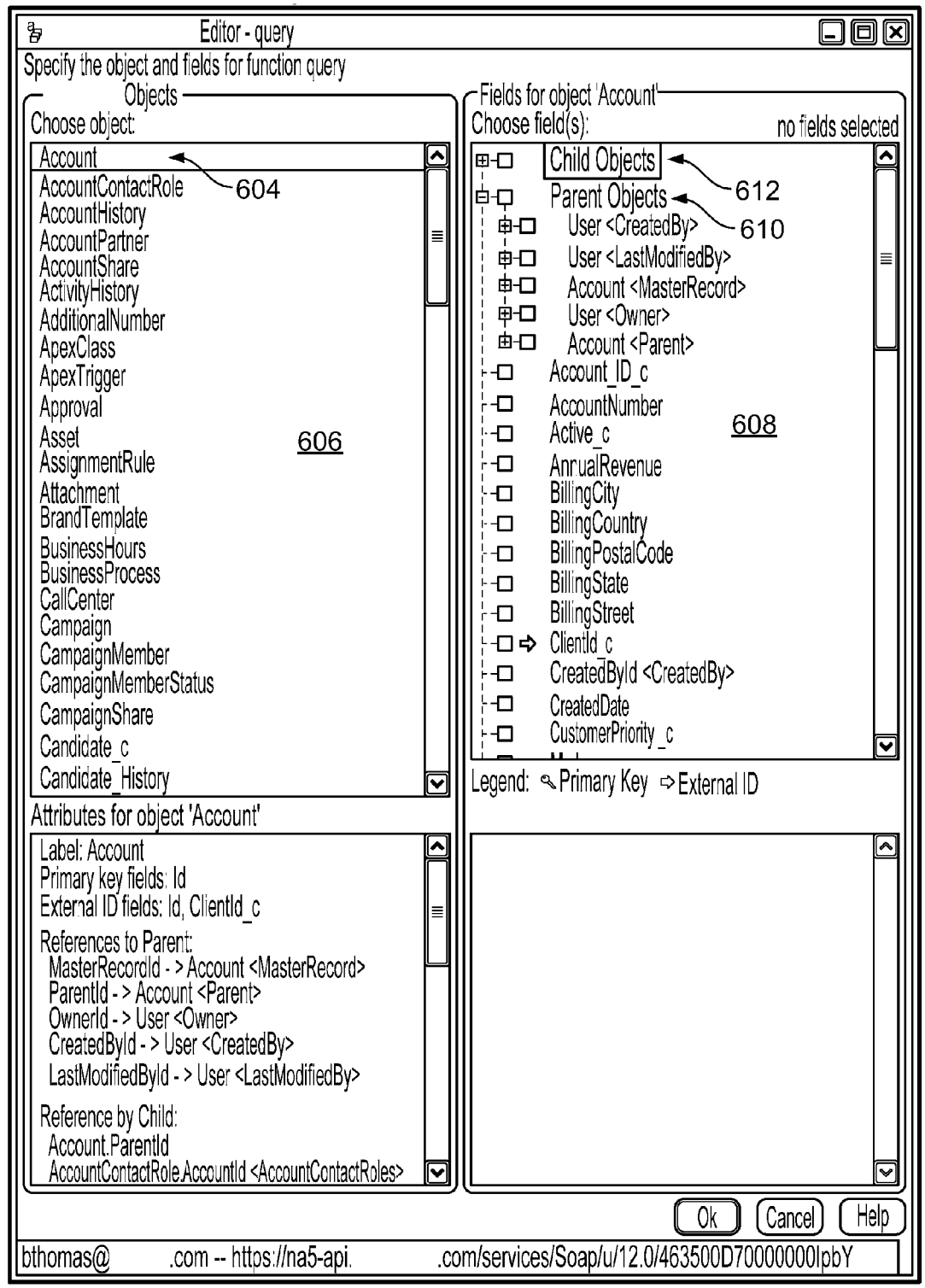

FIG. 6 is a screenshot taken from GUI 106. In this example, an object 604 (again, "Account") is selected in the left pane 606 of the editor 602, and its fields are displayed in the right pane 608. In this case, the relevant operation is the "query" operation. All of the fields in the right pane 508 are selectable by a user; that is, all of the fields are valid and can be selected by a user to be included in the DML for the operation being performed. In the example of FIG. 6, the parent 610 and child 612 objects of the base object ("Account") also are also displayed, and the valid fields of the parent and child objects can be expanded and viewed by a user.

Depending upon the operation being performed by the component, the fields available to a user for an object may be different. That is, the GUI suppresses fields that are not valid for the operation. In some examples, however, the GUI 106 can display invalid fields, but designates those fields as unselectable (e.g., GUI 106 prevents a user from clicking on the field). The GUI 106 could also automatically deselect any invalid fields selected by the user. The GUI 106 can also enforce the selection of only a certain number of fields; that is, if a user selects more than a predetermined number of fields, the GUI could automatically deselect any excess selected fields, or could prevent a user from selecting any additional fields beyond the predetermined number of fields for that operation. For example, if only one field of an object can be given to the operation, GUI 106 may permit the user to select any field at will, but then deselect all other fields of the object automatically. Similarly, the GUI 106 can ensure that fields required by any particular operation appear selected and cannot be deselected by a user. If the operation will accept any number of fields of an object to be selected, the GUI may permit the user to freely select and deselect fields.

The GUI 106 enforces operation-specific rules for field visibility and field selection, and combines the rules with operation-specific rules regarding the type of object. That is, the UI enforces the rules as appropriate to each different type of object hierarchy—different sections of the same tree control will exhibit different, appropriate, selection behaviors. For instance, parent objects may have different selection rules regarding their fields than child or base objects.

Some operations reference (or modify) both an object and its parent or children. For instance, an object might be queried which returns information back from each of its children. The GUI understands which operations may require references to the parent and/or children. It is under these circumstances in which the proper sets of information are displayed in the tree control (e.g., base, base+parents, base+parents+children). Additionally, some fields are visible in these and some are not, and the rules for checking may vary. In some examples, a Query operation shows both the parents and children of an object, most of the fields, and allows selection of multiple fields from the parents and children. An "Upsert" operation, on the other hand, only shows parent objects (in addition to the base fields), and only shows a limited number of fields (key fields), and only allows the selection of one of these fields for each parent object. The end result is a properly constructed record format.

Once the GUI has forced the user to select valid fields of an object for an operation, the GUI may automatically and correctly generate both the DML representation of the record format and the transform function needed by the component to interact with the remote database, given the specific operation. In generating the record formats in DML, the DML can include child and parent sub-objects. Information specific to the generated DML and field selections can also be generated. For instance, the GUI records which fields require special handling, (e.g., fields that must be set to a special operation—"NULL") so that component can provide special instructions to the remote database. The remote database will use these special instructions to take an appropriate action that corresponds to the special value in that field (e.g., the remote database will clear out the field in response to receiving a NULL value in that field).

In some cases, GUI 106 follows a specific, known set of rules (e.g., actions taken based upon operation type). Alternatively, GUI 106 takes action based upon what it has dynamically discovered during a current, live connection to the interface of the remote database. For instance, GUI 106 may determine to exclude certain fields because they make no sense in the current context (e.g., fields that cannot be created in the context of a "Create" operation). Similarly, GUI 106 may preselect fields based upon the attributes of the field. GUI 106 may also show only objects and fields which currently exist. In some examples, there is no hard-coded list of object and fields—this information (like all other information) is determined at run time.

The techniques described herein can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method, including:
    connecting, over a network interface, to a data storage system, the data storage system storing data objects;
    accessing, by a computer system, an interface of the data storage system, the interface providing functions that include (1) a first function that provides access to the data objects already stored in the data storage system, and (2) a second function that creates new data objects to be stored in the data storage system;
    selecting, by the computer system, fields based on one or more rules associated with at least one of the functions provided by the interface, the rules being received from the data storage system and the rules including at least one of (1) a first rule that prevents a field from being selected if that field does not satisfy a validity constraint on that field or on a data object associated with that field, or (2) a second rule that prevents or allows a field to be selected according to a type of a data object associated with that field;
    displaying at least one of the selected fields in a graphical user interface;
    receiving an identification of at least one of the displayed fields from a user of the graphical user interface; and
    processing data records in a data processing environment that is in communication with the data storage system, the processing including:
        accessing, by one or more data processing components, the first function via response messages from the interface of the data storage system, at least some response messages each including multiple data objects representing data of the identified fields, at least some response messages including one or more indicators of successful function execution, and at least some response messages including one or more indicators of failed function execution;
        processing batches of partial results where each batch of partial results includes a response message that includes a different set of multiple data objects;
        transforming each response message including an indicator of successful function execution into multiple data records, by at least one data processing component of the one or more data processing components, where each data record includes data from a respective data object; and
        transferring at least some of the data records between an output port of a data processing component and an input port of a data processing components, the transferring including forwarding data associated with failed function execution to a first input port and forwarding data associated with successful function execution to a second input port.

2. The method of claim 1, wherein the graphical user interface receives input from the user and provides formatting information to at least one of the data processing components, the formatting information defining a format of data records according to one or more fields associated with the data objects, where data records formatted according to the defined format are compatible with the operations performed by the data processing components.

3. The method of claim 1, wherein the graphical user interface displays only data objects or fields that satisfy a validity constraint defined by the rules.

4. The method of claim 1, wherein one or more of the data objects or one or more of the fields displayed by the graphical user interface are selectable.

5. The method of claim 4, wherein data objects or fields that satisfy a validity constraint defined by the rules are automatically selected by the graphical user interface.

6. The method of claim 5, wherein the graphical user interface prevents a user from de-selecting data objects and fields that have been automatically displayed as selected.

7. The method of claim 1, wherein at least one of the data processing components generates a request message to be sent to the data storage system.

8. The method of claim 7, wherein at least one of the data processing components transforms an input having multiple input data records into a single request message.

9. The method of claim 7, wherein at least one of the data processing components generates the request message based on input parameters representing flows of data.

10. The method of claim 9, wherein a user alters the input parameters of the data processing components through a metadata browser.

11. The method of claim 1, wherein at least one of the data processing components separates data associated with successful function execution and data associated with failed function execution.

12. The method of claim 1, wherein connecting to the data storage system includes:
transmitting a login request from at least one of the data processing components to the data storage system;
logging in to the data storage system to obtain session credentials;
storing the session credentials; and
encoding the stored session credentials into one or more login requests.

13. The method of claim 12, wherein the login request is transmitted to an internal gateway.

14. The method of claim 12, wherein the stored session credentials are encoded into a plurality of concurrent login requests.

15. The method of claim 1, wherein processing batches of partial results further includes:
receiving, by a first data processing component, the batches of partial results from the data storage system; and
providing, by the first data processing component while the first data processing component continues to receive batches of partial results, at least some of the partial results to a second data processing component.

16. The method of claim 15, wherein the second processing component generates an output data flow of data records based at least in part on the received partial results.

17. The method of claim 1, wherein at least one of the data processing components includes one or more ports.

18. The method of claim 17, wherein the one or more ports include at least one of: an input port configured to receive an input flow of data, and an output port configured to pass an output flow of data.

19. The method of claim 18, wherein the input flow of data includes a plurality of data records.

20. The method of claim 18, wherein the output flow of data includes a plurality of data records.

21. The method of claim 18, wherein one or both of the input flow of data and the output flow of data includes a plurality of data records.

22. The method of claim 1, wherein the one or more data processing components are represented by nodes in a dataflow graph that are connected by links that represent flows of data.

23. The method of claim 22, wherein the data processing environment provides pipeline parallelism to enable downstream data processing components to execute in parallel with upstream data processing components, according to the dataflow graph.

24. The method of claim 1, wherein the data processing environment comprises a data flow processing environment.

25. The method of claim 24, wherein at least one data processing component of the one or more data processing components processes at least some of the multiple data records in parallel.

26. The method of claim 24, wherein at least one of the data processing components generates multiple request messages in parallel, at least some of which are sent concurrently to the data storage system.

27. The method of claim 24, wherein the data flow processing environment provides pipeline parallelism to enable downstream data processing components to execute in parallel with upstream data processing components.

28. The method of claim 18, wherein generating the output flow of data includes performing operations on one or more batches of partial results received from the data storage system.

29. A system, including:
a network interface including circuitry that connects to a data storage system, the data storage system storing data objects;
a computer system rendering a graphical user interface and configured to:
access an interface of the data storage system, the interface providing functions that include (1) a first function that provides access to the data objects already stored in the data storage system, and (2) a second function that creates new data objects to be stored in the data storage system;
select fields based on one or more rules associated with at least one of the functions provided by the interface, the rules being received from the data storage system and the rules including at least one of (1) a first rule that prevents a field from being selected if that field does not satisfy a validity constraint on that field or on a data object associated with that field, or (2) a second rule that prevents or allows a field to be selected according to a type of a data object associated with that field;
display at least one of the selected fields in the graphical user interface; and
receive an identification of at least one of the displayed fields from a user of the graphical user interface; and
a data processing environment for processing data records in communication with the data storage system, the data processing environment including at least one processor configured to:
access, by one or more data processing components, the first function via response messages from the interface of the data storage system, at least some response messages each including multiple data objects representing data of the identified fields, at least some response messages including one or more indicators of successful function execution, and at least some response messages including one or more indicators of failed function execution; and
process batches of partial results where each batch of partial results includes a response message that includes a different set of multiple data objects;
transform each response message including an indicator of successful function execution into multiple data records, by at least one data processing component of the one or more data processing components, where each data record includes data from a respective data object; and
transfer at least some of the data records between an output port of a data processing component and an input port of a data processing components, the transferring including forwarding data associated with failed function execution to a first input port and forwarding data associated with successful function execution to a second input port.

30. The system of claim 29, wherein the graphical user interface displays only data objects or fields that satisfy a validity constraint defined by the rules.

31. The system of claim 29, wherein one or more of the data objects or one or more of the fields displayed by the graphical user interface are selectable.

32. The system of claim 31, wherein data objects or fields that satisfy a validity constraint defined by the rules are automatically selected by the graphical user interface.

33. The system of claim 32, wherein the graphical user interface prevents a user from de-selecting data objects and fields that have been automatically displayed as selected.

34. The system of claim 29, wherein at least one of the data processing components generates a request message to be sent to the data storage system.

35. The system of claim 34, wherein at least one of the data processing components transforms an input having multiple input data records into a single request message.

36. The system of claim 34, wherein at least one of the data processing components generates the request message based on input parameters representing flows of data.

37. The system of claim 29, wherein at least one of the data processing components separates data associated with successful function execution and data associated with of failed function execution.

38. The system of claim 29, wherein processing batches of partial results further includes:
receiving, by a first data processing component, the batches of partial results from the data storage system; and
providing, by the first data processing component while the first data processing component continues to receive batches of partial results, at least some of the partial results to a second data processing component.

39. The system of claim 38, wherein the second processing component generates an output data flow of data records based at least in part on the received partial results.

40. The system of claim 29, wherein the data processing environment comprises a data flow processing environment.

41. The system of claim 40, wherein at least one data processing component of the one or more data processing components processes at least some of the multiple data records in parallel.

42. The system of claim 40, wherein at least one of the data processing components generates multiple request messages in parallel, at least some of which are sent concurrently to the data storage system.

43. The system of claim 40, wherein the data flow processing environment provides pipeline parallelism to enable downstream data processing components to execute in parallel with upstream data processing components.

44. A system, including:
means for connecting over a network to a data storage system, the data storage system storing data objects;
means for managing a graphical user interface, the managing including:
accessing an interface of the data storage system, the interface providing functions that include (1) a first function that provides access to the data objects already stored in the data storage system, and (2) a second function that creates new data objects to be stored in the data storage system;
selecting fields based on one or more rules associated with at least one of the functions provided by the interface, the rules being received from the data storage system and the rules including at least one of (1) a first rule that prevents a field from being selected if that field does not satisfy a validity constraint on that field or on a data object associated with that field, or (2) a second rule that prevents or allows a field to be selected according to a type of a data object associated with that field;
displaying at least one of the selected fields in the graphical user interface; and
receiving an identification of at least one of the displayed fields from a user of the graphical user interface; and
means for processing data records in a data processing environment that is in communication with the data storage system, the processing including:
accessing, by one or more data processing components, the first function via response messages from the interface of the data storage system, at least some response messages each including multiple data objects representing data of the identified fields, at least some response messages including one or more indicators of successful function execution, and at least some response messages including one or more indicators of failed function execution;
processing batches of partial results where each batch of partial results includes a response message that includes a different set of multiple data objects;
transforming each response message including an indicator of successful function execution into multiple data records, by at least one data processing component of the one or more data processing components, where each data record includes data from a respective data object; and
transferring at least some of the data records between an output port of a data processing component and an input port of a data processing components, the transferring including forwarding data associated with failed function execution to a first input port and forwarding data associated with successful function execution to a second input port.

45. A non-transitory computer-readable storage medium storing a computer program, the computer program including instructions for causing a computer system to:
connect, over a network interface, to a data storage system, the data storage system storing data objects;
access an interface of the data storage system, the interface providing functions that include (1) a first function that provides access to the data objects already stored in the data storage system, and (2) a second function that creates new data objects to be stored in the data storage system;
select fields based on one or more rules associated with at least one of the functions provided by the interface, the rules being received from the data storage system and the rules including at least one of (1) a first rule that prevents a field from being selected if that field does not satisfy a validity constraint on that field or on a data object associated with that field, or (2) a second rule that prevents or allows a field to be selected according to a type of a data object associated with that field;
display at least one of the selected fields in a graphical user interface;
receive an identification of at least one of the displayed fields from a user of the graphical user interface; and
process data records in a data processing environment, the processing including:
accessing, by one or more data processing components, the first function via response messages from the interface of the data storage system, at least some response messages each including multiple data objects representing data of the identified fields, at least some response messages including one or more indicators of successful function execution, and at least some response messages including one or more indicators of failed function execution;

processing batches of partial results where each batch of partial results includes a response message that includes a different set of multiple data objects;

transforming each response message including an indicator of successful function execution into multiple data records, by at least one data processing component of the one or more data processing components, where each data record includes data from a respective data object; and transferring at least some of the data records between an output port of a data processing component and an input port of a data processing components, the transferring including forwarding data associated with failed function execution to a first input port and forwarding data associated with successful function execution to a second input port.

46. The non-transitory computer-readable storage medium of claim 45, wherein the graphical user interface displays only data objects or fields that satisfy a validity constraint defined by the rules.

47. The non-transitory computer-readable storage medium of claim 45, wherein one or more of the data objects or one or more of the fields displayed by the graphical user interface are selectable.

48. The non-transitory computer-readable storage medium of claim 47, wherein data objects or fields that satisfy a validity constraint defined by the rules are automatically selected by the graphical user interface.

49. The non-transitory computer-readable storage medium of claim 48, wherein the graphical user interface prevents a user from de-selecting data objects and fields that have been automatically displayed as selected.

50. The non-transitory computer-readable storage medium of claim 45, wherein at least one of the data processing components generates a request message to be sent to the data storage system.

51. The non-transitory computer-readable storage medium of claim 50, wherein at least one of the data processing components transforms an input having multiple input data records into a single request message.

52. The non-transitory computer-readable storage medium of claim 50, wherein at least one of the data processing components generates the request message based on input parameters representing flows of data.

53. The non-transitory computer-readable storage medium of claim 45, wherein at least one of the data processing components separates data associated with successful function execution and data associated with of failed function execution.

54. The non-transitory computer-readable storage medium of claim 45, wherein processing batches of partial results further includes:

receiving, by a first data processing component, the batches of partial results from the data storage system; and providing, by the first data processing component while the first data processing component continues to receive batches of partial results, at least some of the partial results to a second data processing component.

55. The non-transitory computer-readable storage medium of claim 54, wherein the second processing component generates an output data flow of data records based at least in part on the received partial results.

56. The non-transitory computer-readable storage medium of claim 45, wherein the data processing environment comprises a data flow processing environment.

57. The non-transitory computer-readable storage medium of claim 56, wherein at least one data processing component of the one or more data processing components processes at least some of the multiple data records in parallel.

58. The non-transitory computer-readable storage medium of claim 56, wherein at least one of the data processing components generates multiple request messages in parallel, at least some of which are sent concurrently to the data storage system.

59. The non-transitory computer-readable storage medium of claim 56, wherein the data flow processing environment provides pipeline parallelism to enable downstream data processing components to execute in parallel with upstream data processing components.

* * * * *